Nov. 23, 1943.  C. T. RASMUSSEN ET AL  2,334,842
ROTARY HOE
Filed March 6, 1942  2 Sheets-Sheet 1

INVENTORS
CLARENCE T. RASMUSSEN
ARTHUR J. BJERKAN
BY
ATTORNEYS

Nov. 23, 1943.           C. T. RASMUSSEN ET AL           2,334,842
                              ROTARY HOE
                          Filed March 6, 1942           2 Sheets-Sheet 2

INVENTORS
CLARENCE T. RASMUSSEN
ARTHUR J. BJERKAN
BY
ATTORNEYS

Patented Nov. 23, 1943

2,334,842

UNITED STATES PATENT OFFICE 2,334,842

ROTARY HOE

Clarence T. Rasmussen and Arthur J. Bjerkan, Moline, Ill., assignors to Deere & Company, Moline, Ill., a corporation of Illinois Application March 6, 1942, Serial No. 433,570

14 Claims. (Cl. 55—126)

The present invention relates generally to agricultural machines and more particularly to tillage implements in which two or more ground working units are connected together in flexible relation. More particularly, the present invention relates to certain improvements in rotary hoes, an implement in which interconnected gangs of toothed ground engaging wheels are propelled along the ground to break up the soil crust, stir the soil adjacent crop plants and destroy weeds and other objectionable plants just starting to take root.

The object and general nature of the present invention is the provision of a rotary hoe that is made up of two or more substantially identical units or sections that are flexibly connected together and are free to move up and down, one with respect to the other, but are restrained against relative movement in a generally horizontal plane. More particularly, it is a feature of this invention to provide connections between adjacent sections in the nature of hinges whereby the sections are rigid with respect to each other in all directions except about the one axis defined by the hinged connection.

Another important feature of the present invention is the provision of a new type of frame which is particularly constructed so as to provide more clearance not only over the hoe wheels but also between the front and rear end hoe wheels, where in conventional rotary hoes clearance is objectionably small. Specifically, it is a feature of this invention to provide an improved rotary hoe frame in which the need for tie bars between the front and rear axles of the hoe wheel gangs is eliminated, thus providing maximum clearance between the hoe wheels, particularly at the ends.

These and other objects and advantages of the present invention will be apparent to those skilled in the art after a consideration of the following detailed description, taken in conjunction with the accompanying drawings in which the preferred construction has been illustrated.

Figure 1:
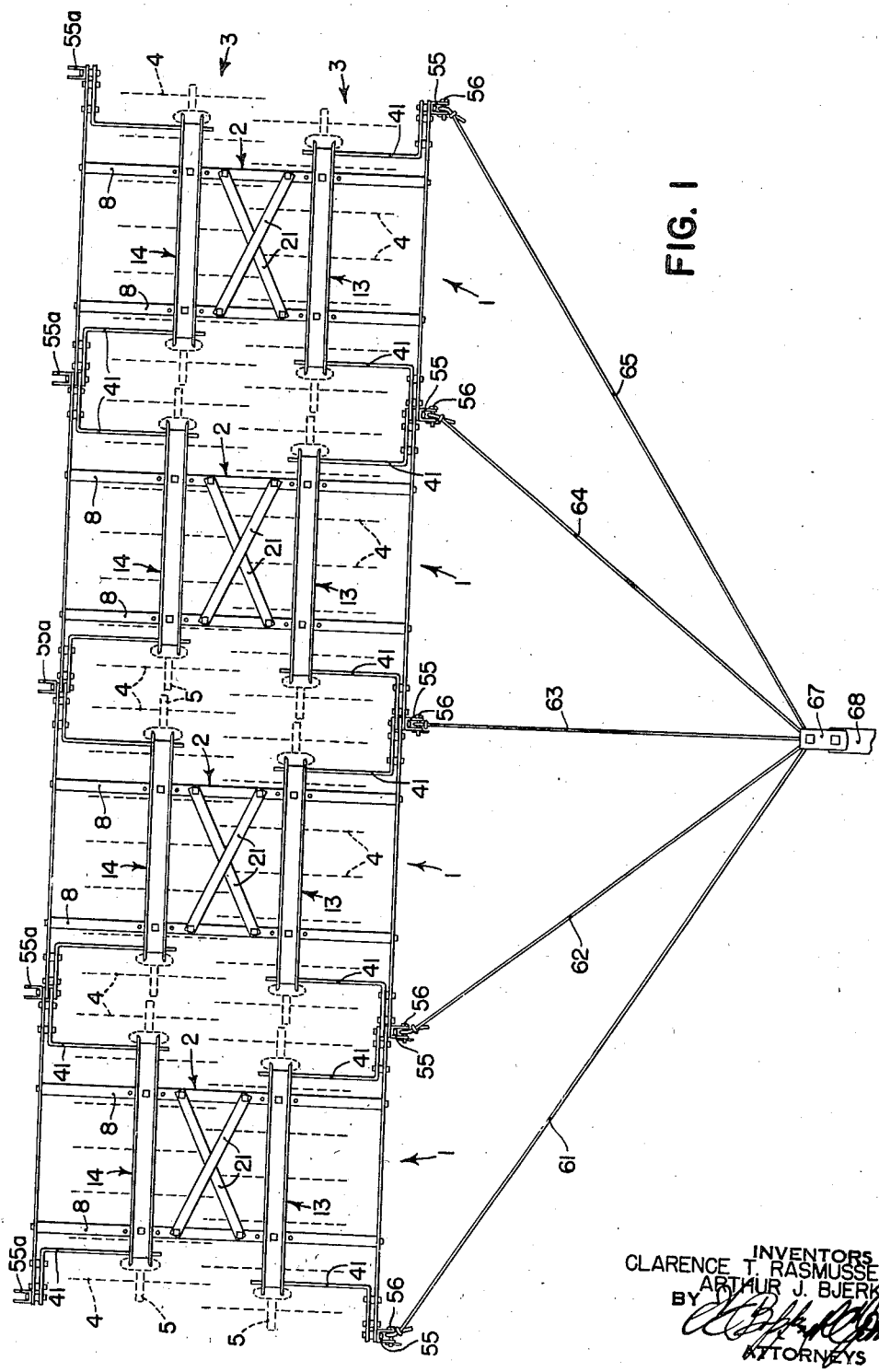
Figure 1 is a plan view of a four-row tractor-drawn rotary hoe in which the principles of the present invention have been incorporated.
Figure 2:
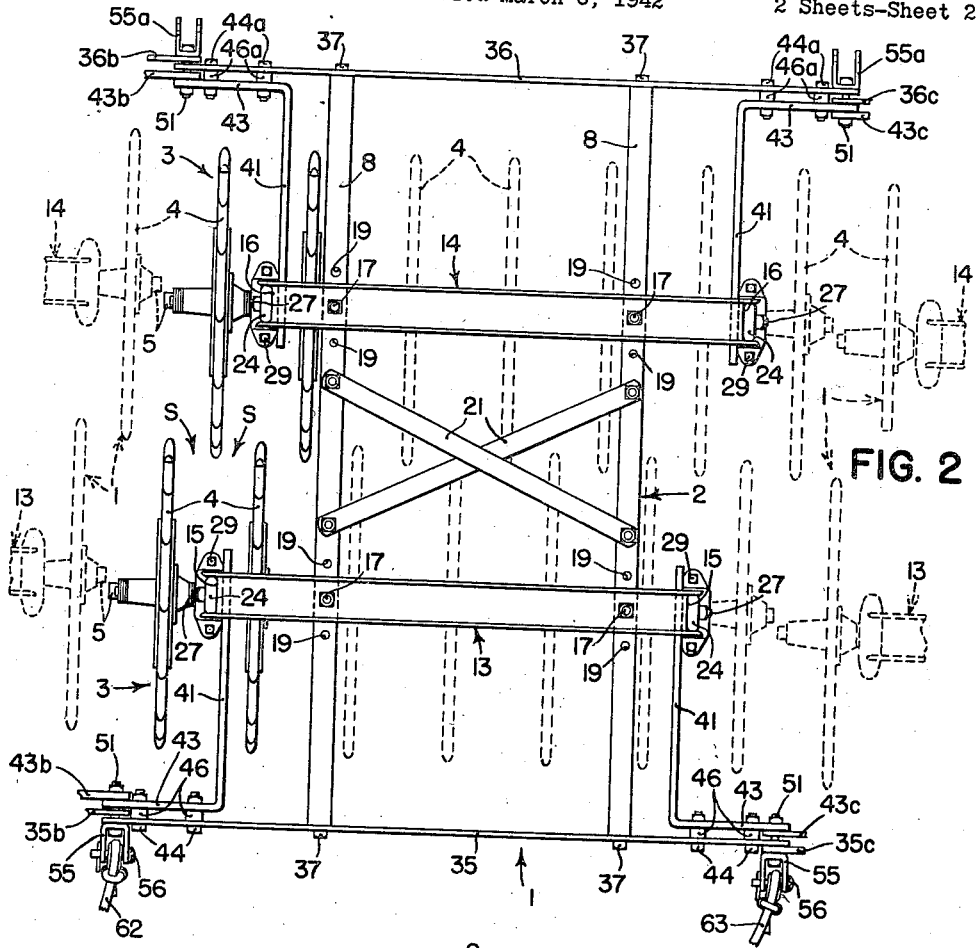
Figure 2 is a plan view of a single section of the rotary hoe shown in Figure 1.

Referring now to the drawings, the rotary hoe embodying the present invention is illustrated as a four-row machine, comprising four substantially identical rotary hoe sections 1. As best shown in Figure 2, each rotary hoe section 1 comprises a frame 2 and two sets 3 of rotary hoe wheels 4, the wheels 4 of each set being mounted on a transverse shaft 5.

The frame 2 of each rotary hoe section is of particular construction and will now be described. The frame 2 includes two longitudinally extending arch members 8, preferably of angle iron, and each longitudinal member 8 includes a downturned front end 9 and a rear downturned end 10. The frame 2 also includes a pair of fore and aft spaced apart transverse arch members 13 and 14, these members preferably being of channel cross section with the flanges extending upwardly and outwardly. Each of the arch channel members 13 and 14 includes downturned ends 15 and 16, respectively. Preferably, the arch channel members 13 and 14 are of identical construction to simplify manufacturing routine. As shown in Figure 2, the transverse members 13 and 14 are secured by bolts 17 to the longitudinal members 8, the generally intermediate portions of the members 13 and 14 being thus rigidly secured to the generally intermediate portions of the longitudinal members 8. The latter members are provided with a plurality of apertures 19 so as to provide for fixing the cross members 13 and 14 to the longitudinal members 8 in different positions, thereby making it convenient to adjust the spacing between the sets or units 3 of rotary hoe wheels, as will be explained below. It will be noted from Figure 2 that the holes in the arch channel members 13 and 14 to receive the bolts 17 are not quite the same distance from the ends of the member. Instead, one hole is closer to the adjacent end than the other hole. This permits securing the members 13 and 14 to the members 8 in the offset relation shown in Figure 2, with one end of one member disposed laterally outwardly beyond the other member at one side of the frame, the other end of said other member therefore being disposed laterally outwardly beyond the end of the first member at the other side of the frame. The two members 8 of each frame 2 are reenforced by cross braces 21.

Figure 3:
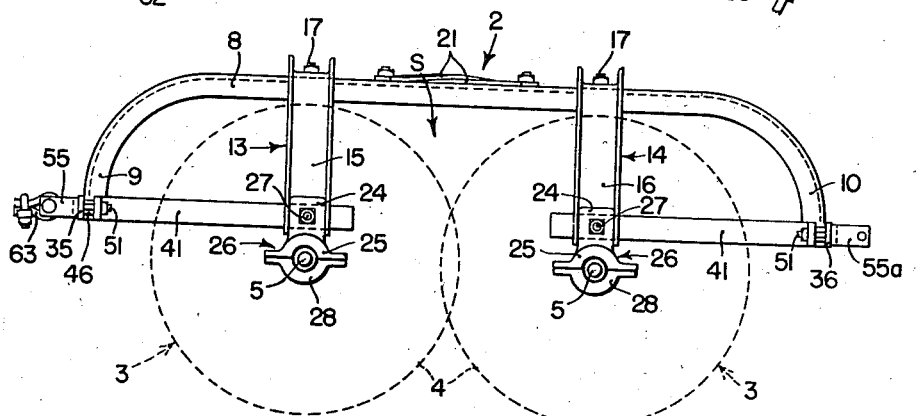
Figure 3 is an end view of the section shown in Figure 2.

The downturned ends 15 and 16 of the arch channel members 13 and 14 are apertured to receive the shank 24 of the upper half 25 of the hoe wheel shaft-receiving bearing 26. Preferably, each shank 24 is formed so as to fit snugly between the flanges of the associated arch channel member, as best shown in Figure 3. The upper bearing half 25 is secured to the associated end of the arch channel member by a bolt 27. The lower half or bearing cap of the bearing 26 is indicated by the reference numeral 28. Bolts 29 secure the two bearing parts of each bearing about the associated hoe wheel shaft 5. The frame 2 also includes front and rear cross bars 35 and 36, each being secured, as by a bolt 37, to the downturned front and rear ends of the longitudinal frame members 8. As best shown in Figure 2, the front and rear cross bars 35 and 36 extend laterally outwardly beyond the ends of the longitudinal members 8. A brace 41, substantially L-shaped, is connected between each laterally outer end of each cross bar and the adjacent downturned end of the associated arch channel member. Each of the front braces 41 has its rear end apertured to receive the bolt 27 that secures the associated bearing 26 in place, and the forward end of each front brace is extended laterally, as at 43, and is apertured to receive a pair of bolts 44 by which the front end of each front brace is secured to the front cross bar 35 in spaced relation, with spacers 46 disposed therebetween. The rear braces 41 also have laterally outturned ends 43 which are secured, as by bolts 44a, to the ends of the rear cross bar 36, with spacers 46a therebetween.

The several rotary hoe sections 1 are hingedly connected together by pivot means that restrains any movement of one section relative to the other except movement about a generally fore and aft axis defined by the hinged connecting means. As best shown in Figure 2, the laterally outermost end portions of the cross bars 35 and 36 and the associated laterally outwardly directed portions 43 of the braces 41 are apertured to receive pivot bolts 51, and the rotary hoe sections are assembled with the ends of the braces 41 and bars 35, 36 in overlapping relation, the laterally outwardly directed portions of the brace members and cross bars at the front portions of the adjacent rotary hoe sections being indicated by the reference numerals 35b, 35c and 43b, 43c, respectively. At the normally front side of the rotary hoe, each of the pivot bolts carries a U-shaped member 55 which is apertured to receive a pin 56 held in the member 55 by any suitable means. The connection between the rotary hoe sections at the normally rear side of the implement is substantially the same as that just described, the rear pivot bolts 51 receiving rear members 55a which are apertured to receive the pins 56 under certain conditions as described below. From the above description it will be seen, therefore, that each frame 2 includes laterally outwardly directed extensions, disposed beyond the ends of the arch members 13 and 14, by which each rotary hoe section may be hingedly connected to the lateral extensions of the adjacent rotary hoe section, thereby providing for upward and downward swinging of each section relative to the adjacent sections but restraining all relative movement in any other direction.

A plurality of cables 61, 62, etc., are provided with loops at their rear ends to receive the associated pins 56, and the forward ends of the several cables are connected by a clevis 67 to a tractor or other source of power, represented by the drawbar 68.

As best shown in Figure 2, the two sets of units of hoe wheels are arranged with the wheels of one unit in staggered or overlapping relation with respect to the adjacent portions of the wheels of the other unit, the axle shafts 5 being supported in the bearings 26 at the lower ends of the transverse arch members 13 and 14. The latter members, as mentioned above, are fixed to the longitudinal bars 8 in offset relation in order to dispose the wheels of one hoe wheel unit in between the wheels of the other unit, which is the desired relation. The frame structure 2 of the present invention therefore permits the use of identical front and rear hoe wheel gangs for mounting them in such a manner that the wheels are disposed in the overlapping relation desired. As best shown in Figure 3, the rear ends of the forward braces 41 terminate at the front bearings 26 while the forward ends of the rear braces 41 terminate at the rear bearings 26, thus leaving an open space S between the arch members 13 and 14 and underneath the longitudinal bars 8. Since the latter are arch members they pass over the associated hoe wheels with ample clearance, and since the braces are not continuous between the front and rear cross bars 35 and 36, there is no restriction, as in prior rotary hoes, between the end wheels, as would occur if single brace bars were provided and extended from front to rear in between the end wheels. Therefore, according to the principles of the present invention, there is as much clearance between the end hoe wheels as any of the other hoe wheels.

In operation, since the sections are connected together for relative movement about a single hinge axis, the sections are free to swing up and down relative to one another when rough or irregular conditions are encountered in the field, yet the several sections are firmly and positively held in transverse alignment, making it unnecessary to have an evener bar or other complicated hitch arrangements. Instead, a simple cable hitch may be used. A particular frame construction provides ample clearance at the ends of the sections, yet the hoe wheels at the ends of the sections are as close together as the wheels in the intermediate portions of the sections. Hence, there is no skipping between sections and the implement, although relatively wide, cultivates and mulches the soil for the full width of the entire implement, due to the particular frame construction that permits bringing the end wheels of one section close to the end wheels of the adjacent section but without interfering with the clearance between the wheels.

While there has been shown and described above the preferred structure in which the principles of the present invention have been incorporated, it is to be understood that the present invention is not to be limited to the particular details shown and described above, but that, in fact, widely different means may be employed in the practice of the broader aspects of this invention.

What is claimed is:

1. In a rotary hoe, a frame including rigidly interconnected front and rear arch members disposed transverse with the end portions thereof disposed downwardly, and a pair of hoe wheel units journaled directly on the lower end portions of said arch members, the space between the downwardly disposed end portions at each side of the hoe being open and said downwardly disposed end portions constituting the principal stress-bearing members transmitting draft to said units.

2. In a rotary hoe, a rotary hoe section comprising a frame including a pair of generally longitudinally extending members, a pair of transverse arch members fixed in fore and aft spaced relation to said longitudinal members, a pair of hoe wheel units, said arch members being disposed respectively in the vertical transverse planes of said hoe wheel units, means journaling the forward unit directly to the downturned ends of the forward arch member, means journaling the rear hoe unit on the downturned ends of the rear arch bar, and means connecting the downturned ends of the front and rear arch members to the front and rear ends, respectively, of said longitudinal members.

3. In a rotary hoe, a rotary hoe section comprising a frame including a pair of transversely disposed fore and aft spaced arch members arranged in offset relation, and a pair of hoe wheel sections journaled directly on the downturned ends of said transverse arch members, said offset providing for the disposition of the hoe wheels of one section in between the hoe wheels of the other section.

4. In a rotary hoe, a rotary hoe section comprising a pair of longitudinally extending arch members, a pair of transverse longitudinally spaced apart arch members, means rigidly fixing said arch members together, a transverse bar connected to the downturned forward ends of said longitudinally extending arch members, a second transverse bar fixed to the downturned rear ends of said longitudinally extending arch members, link members extending from the downturned ends of the forward transverse arch member to the forward bar, and links extending rearwardly from the downturned ends of said rear arch bar to said rear transverse bar, there being an open hoe wheel receiving space between the downturned ends of said front and rear transverse arch bars.

5. In a rotary hoe, a rotary hoe section comprising a pair of rotary hoe wheel units, each including a shaft and a plurality of relatively closely spaced hoe wheels, a frame comprising a pair of longitudinally extending bars and a pair of longitudinally spaced apart transversely extending arch members, each having downturned ends, and means fixing said arch members to said longitudinally extending members in laterally offset relation, and journal means at the lower ends of said arch members to receive the shafts of said hoe wheel units, the amount of offset and the space longitudinally between said arch members being such that the hoe wheels on one shaft are disposed between the hoe wheels on the other shaft.

6. In a rotary hoe, a rotary hoe section comprising a frame including longitudinal members, a cross bar fixed to the front and rear ends of said longitudinal members, and a pair of arch bars fixed rigidly to said longitudinal members, a pair of rotary hoe units, each including a shaft and a plurality of rotary hoes thereon, journal means on the lower ends of both of said transverse arch members for receiving the shaft of the associated rotary hoe unit so that the downturned ends of said transverse arch members extend between the two end hoe wheels at each end of each shaft, a pair of front braces connected at their rear ends to the downturned ends of the front arch member and at their forward ends to the laterally outer ends of said front transverse bar, and a pair of rear braces connected at their forward ends to the downturned ends of the rear transverse arch member and at their rear ends to the rear transverse bar.

7. In a rotary hoe, a rotary hoe section comprising a pair of rotary hoe units, each consisting of a shaft and a plurality of hoe wheels mounted thereon, said rotary hoe units being arranged with the hoe wheels of one unit disposed in between the adjacent portions of the wheels of the other unit, frame means including a pair of transverse arch bars, one for each of said units, each arch bar having its lower end in journaled connection with the associated rotary hoe unit, between the two end wheels thereof, said frame also including front and rear cross bars disposed generally in the plane of said hoe wheel shafts, and a bar connected to each of the down-turned ends of each of said arch members, said bar extending generally longitudinally and connected to the adjacent cross bar and disposed in a position spaced from but lying in the vertical longitudinal plane extending through the adjacent hoe wheel of the other rotary hoe unit, whereby said frame is braced in a generally longitudinal direction without restricting the space between the adjacent overlapping hoe wheels.

8. In a rotary hoe, a rotary hoe section comprising frame means including longitudinally extending frame members, transverse members at the forward and rear ends of said longitudinal members, and arch members disposed transversely and fixed to said longitudinal members in fore and aft spaced relation, a pair of rotary hoe wheel units journaled for rotation on the lower downturned ends of said arch members, respectively, said rotary hoe wheel units being disposed with the hoe wheels thereof in overlapping relation, said arch members being offset in a transverse direction, one with respect to the other, so as to dispose the wheels of one hoe wheel unit in between the adjacent portions of the wheels of the other hoe wheel unit, and two pairs of brace members, one pair for each of said arch members, each of said brace members being fixed to the downturned end of the associated arch member and extending therefrom toward the adjacent end of the associated transverse frame member, said brace member having a portion extending along the associated transverse member, and said portions of said transverse members and said brace members extending transversely beyond the hoe wheel units so as to provide for the connection of two or more rotary hoe sections together in generally transverse alignment.

9. The invention set forth in claim 8, further characterized by the provision of a plurality of such rotary hoe sections with the laterally extending portions at one side of each rotary hoe section overlapping the adjacent and similar portions of the adjacent rotary hoe section, and pivot means passing through said overlapping portions of adjacent sections whereby the latter are connected together for vertical hinging movement but are restrained thereby against relative movement in any other direction.

10. A rotary hoe comprising a plurality of at least two rotary hoe sections, each section including rotary hoe wheel units and a frame in which the units are journaled for rotation, said frame having lateral extensions at each side thereof extending beyond said hoe wheel units, the lateral extensions of one section overlapping the lateral extensions of adjacent sections, and pivot means connecting said overlapping lateral extensions, each of said pivots having cable receiving means.

11. A frame for a rotary hoe or the like, comprising a pair of generally longitudinally extending frame members having downturned portions at their ends, fore and aft spaced members including downwardly extending portions fixed to said longitudinal members between their ends, and generally fore and aft extending brace means extending from the downturned end portions of said longitudinal members inwardly toward and fixed to said downwardly extending sections of the fore and aft spaced members, there being an open unobstructed space between said downwardly extending sections.

12. In a rotary hoe, a rotary hoe section comprising a frame including rigidly interconnected front and rear arch members disposed transverse with the end portions thereof disposed downwardly, cross bars disposed in the plane of and spaced fore and aft from the downwardly disposed ends of said arch members, brace means connected at its rear ends to the downwardly disposed ends of the forward arch member and at its forward ends to the forward cross bar, and brace means connected at its forward ends to the downwardly disposed ends of the rear arch member and at its rear ends to the rear cross bar.

13. In a rotary hoe, a frame comprising a pair of rigid longitudinal stress-bearing members, spaced apart laterally, a pair of rigid stress-bearing longitudinally spaced transverse arch members and means rigidly securing the intermediate portions of said arch members to said longitudinal members with the end portions of said arch members disposed downwardly and with an open space between the generally vertical planes of said end portions below said longitudinal members, and rotary hoe units connected directly to the end portions of said arch members and disposed in said open space of said frame.

14. In a rotary hoe, a frame comprising a pair of rigid longitudinal stress-bearing members, spaced apart laterally, a pair of substantially identical rigid stress-bearing longitudinally spaced transverse arch members and means rigidly securing the intermediate portions of said arch members to said longitudinal members with the end portions of said arch members disposed downwardly, and a pair of identical hoe units, each comprising a shaft with hoe wheels thereon, journaled directly on the lower ends of the downwardly extending end portions of said arch members, one end portion of one arch member at one side of the hoe being disposed closer to the adjacent longitudinal member than the distance between the other end portion of said one arch member and the other longitudinal member, and the end portion of the other arch member at the other side of the hoe being disposed closer to said other longitudinal member than the distance between the end portion of said other arch member at said one side of the hoe and the adjacent longitudinal member, whereby the hoe wheels of one of said identical units are disposed in staggered relation with respect to the hoe wheels of the other unit.

CLARENCE T. RASMUSSEN.
ARTHUR J. BJERKAN.